United States Patent [19]

Kukes et al.

[11] Patent Number: 4,971,680
[45] Date of Patent: * Nov. 20, 1990

[54] HYDROCRACKING PROCESS

[75] Inventors: Simon G. Kukes; Victor K. Shum, both of Naperville; P. Donald Hopkins, St. Charles; L. Charles Gutberlet, Wheaton, all of Ill.

[73] Assignee: Amoco Corporation, Chicago, Ill.

[*] Notice: The portion of the term of this patent subsequent to Apr. 11, 2006 has been disclaimed.

[21] Appl. No.: 287,399

[22] Filed: Dec. 20, 1988

Related U.S. Application Data

[63] Continuation-in-part of Ser. No. 124,280, Nov. 23, 1987, Pat. No. 4,820,403.

[51] Int. Cl.$^5$ .............................................. C10G 47/16
[52] U.S. Cl. ...................................... 208/111; 208/68; 208/112
[58] Field of Search .................. 208/111, 112, 68, 59, 208/89

[56] References Cited

U.S. PATENT DOCUMENTS

| | | | |
|---|---|---|---|
| 3,963,600 | 6/1976 | Hilfman | 208/59 |
| 4,183,801 | 1/1980 | Breuker et al. | 208/89 |
| 4,604,187 | 8/1986 | Ward | 208/111 |
| 4,743,355 | 5/1988 | Ward | 208/89 |
| 4,746,419 | 5/1988 | Peck et al. | 208/59 |
| 4,789,457 | 12/1988 | Fischer et al. | 208/68 |
| 4,797,195 | 1/1989 | Kukes et al. | 208/111 |
| 4,797,196 | 1/1989 | Kukes et al. | 208/111 |
| 4,812,224 | 3/1989 | Miller | 208/68 |
| 4,820,403 | 4/1989 | Gutberlet et al. | 208/68 |
| 4,828,676 | 5/1989 | Sawyer et al. | 208/59 |
| 4,834,865 | 5/1989 | Kukes et al. | 208/59 |

*Primary Examiner*—Anthony McFarlane
*Attorney, Agent, or Firm*—Ekkehard Schoettle; William H. Magidson; Ralph C. Medhurst

[57] ABSTRACT

A hydrocarbon conversion process is disclosed involving the hydrocracking of a catalytic cycle oil in the presence of a catalyst having a nickel component, a tungsten component, and a support component containing a crystalline molecular sieve material present in an amount ranging from about 25 to about 60 wt. % based on the weight of the support component wherein at least about 1 to about 80 wt. % of the sieve material is a gallosilicate, based on the total weight of the sieve component.

24 Claims, No Drawings

HYDROCRACKING PROCESS

CROSS-REFERENCE TO RELATED APPLICATIONS

The present application is a continuation-in-part of application Ser. No. 124,280 filed on Nov. 23, 1987 now U.S. Pat. No. 4,820,403.

BACKGROUND OF THE INVENTION

The present invention relates to a hydrocarbon conversion process. More particularly, this invention relates to the catalytic hydrocracking of hydrocarbons.

The hydrocracking of hydrocarbons is old and well-known in the prior art. These hydrocracking processes can be used to hydrocrack various hydrocarbon fractions such as reduced crudes, gas oils, heavy gas oils, topped crudes, shale oil, coal extract and tar extract wherein these fractions may or may not contain nitrogen compounds. Modern hydrocracking processes were developed primarily to process feeds having a high content of polycyclic aromatic compounds, which are relatively unreactive in catalytic cracking. The hydrocracking process is used to produce desirable products such as turbine fuel, diesel fuel, and light distillate products such as naphtha and gasoline.

The hydrocracking process is generally carried out in any suitable reaction vessel under elevated temperatures and pressures in the presence of hydrogen and a hydrocracking catalyst so as to yield a product containing the desired distribution of hydrocarbon products.

Hydrocracking catalysts generally comprise a hydrogenation component on an acidic cracking support. More specifically, hydrocracking catalysts comprise a hydrogenation component selected from the group consisting of Group VIA metals and Group VIII metals of the Periodic Table of Elements, their oxides or sulfides. The prior art has also taught that these hydrocracking catalysts contain an acidic support comprising a crystalline aluminosilicate material such as Y-type aluminosilicate materials. This crystalline aluminosilicate material is generally suspended in a refractory inorganic oxide such as silica, alumina, or silica-alumina.

While the prior art has generally taught the use of molecular sieves, especially crystalline aluminosilicate materials such as type X and type Y in hydrocracking catalysts, the use of other types of molecular sieves has also been suggested in various other types of hydrocarbon conversion processes. For instance, U.S. Pat. No. 4,304,686 (Telford) discloses the use of gallium exchanged zeolites in hydrocarbon conversion reactions such as dehydrocyclodimerization reactions. U.S. Pat. No. 3,944,482 (Mitchell et al.) discloses the use of a variety of molecular sieves, of which a gallosilicate can be one, in connection with a fluidized catalytic cracking process, U.S. Pat. No. 4,620,921 (Chang et al.) discloses a zeolite material having enhanced acid, e.g. cracking, activity wherein a high silica content zeolite is hydrothermally treated in the presence of a compound of aluminum or gallium.

Regarding the hydrocracking catalyst hydrogenation components, the art has generally recognized that the preferred Group VIA metals are tungsten and molybdenum while the preferred Group VIII metals are nickel and cobalt.

The prior art has further taught that combinations of metals for the hydrogenation component, expressed as oxides and in the order of preference, are: $NiO-WO_3$, $NiO-Mo_3$, $CoO-Mo_3$, and $CoO-W_3$.

Other hydrogenation components broadly taught by the prior art include iron, ruthenium, rhodium, palladium, osmium, indium, platinum, chromium, molybdenum, vanadium, niobium, and tantalum.

References that disclose hydrocracking catalysts utilizing nickel and tungsten as hydrogenation components, teach enhanced hydrocracking activity when the matrix or catalyst support contains silica-alumina. For instance, U.S. Pat. Nos. 4,576,711, 4,563,434, and 4,517,073 all to Ward et al., show at Table V thereof that the lowest hydrocracking activity is achieved when alumina is used in the support instead of a dispersion of silica-alumina in alumina. The lowest hydrocracking activity is indicated by the highest reactor temperature required to achieve 60 vol.% conversion of the hydrocarbon components boiling above a predetermined boiling range temperature end point to below that boiling range temperature end point.

Similarly, U.S. Pat. No. 3,536,605 to Kittrell et al. teaches the use of silica-alumina in the catalyst support when a nickel- and tungsten-containing hydrogenation component is employed.

U.S. Pat. No. 3,598,719 to White teaches a hydrocracking catalyst that can contain no silica; however, the patent does not present an example showing the preparation of a catalyst devoid of silica nor does the patent teach the preferential use of nickel and tungsten as hydrogenation metals.

As can be appreciated from the above, there is a myriad of catalysts known for hydrocracking whose catalytic properties vary widely. A catalyst suitable for maximizing naphtha yield may not be suitable for maximizing the yield of turbine fuel. Further, the degree of cracking and yield structure is also dependent upon the feedstock composition.

Catalysts having high hydrogenation activity relative to acidity yield more highly saturated products as required in distillate fuels such as jet or aviation fuel.

Reconciling hydrodenitrogenation activity with hydrocracking activity in a single hydrocracking catalyst presents a difficulty. For instance, when a feedstock having a high nitrogen content is exposed to a hydrocracking catalyst containing a high amount of cracking component, the nitrogen serves to poison or deactivate the cracking component. Another difficulty is presented when the hydrocracking process is used to maximize naphtha yields from a feedstock containing light catalytic cycle oil which has a very high aromatics content. The saturation properties of the catalyst must be carefully gauged to saturate only one aromatic ring of a binuclear aromatic compound such as naphthalene in order to preserve desirable high octane value aromatic-containing hydrocarbons for the naphtha fraction. If the saturation activity is too high, all of the aromatic rings will be saturated and subsequently cracked to lower octane value paraffins.

On the other hand, distillate fuels such as diesel fuel or aviation fuel have specifications that stipulate a relatively low aromatics content. This is due to the undesirable smoke production caused by the combustion of aromatics in diesel engines and jet engines.

Prior art processes designed to convert high nitrogen content feedstocks and produce jet fuel are usually two stage processes wherein the first stage is designed to convert organic nitrogen compounds to ammonia prior to contacting with a hydrocracking catalyst which contained a high amount of cracking component; e.g., a molecular sieve material.

For instance, U.S. Pat. No. 3,923,638 to Bertolacini et al. discloses a two-catalyst process suitable for converting a hydrocarbon containing substantial amounts of nitrogen to saturated products adequate for use as jet fuel. Specifically, the subject patent discloses a process wherein the hydrodenitrogenation catalyst comprises as a hydrogenation component a Group VIA metal and Group VIII metal and/or their compounds and a cocatalytic acidic support comprising a large-pore crystalline aluminosilicate material and refractory inorganic oxide. The hydrocracking catalyst comprises as a hydrogenation component a Group VIA metal and a Group VIII metal and/or their compounds, and an acidic support of large-pore crystalline aluminosilicate material. For both hydrodenitrogenation catalyst and the hydrocracking catalyst, the preferred hydrogenation component comprises nickel and tungsten and/or their compounds and the preferred large-pore crystalline aluminosilicate material is ultrastable Y large-pore crystalline aluminosilicate material.

Thus there is a need for a single catalyst that possesses high hydrodenitrogenation, hydrocracking, and polyaromatic saturation activity. Specifically, there is a need for a catalyst that is capable of maximizing naphtha selectivity, especially heavy naphtha having a boiling range from 180° F. to 380° F. and octane value.

In accordance with the present invention the hydrodenitrogenation, hydrocracking, and polyaromatic saturation activities are maximized in one catalyst when a feedstock containing highly aromatic light catalytic cycle oil is converted. Further, the process of the invention provides for increased selectivity towards high octane heavy naphtha with decreased undesirable selectivity towards $C_1$ to $C_5$ light gas.

SUMMARY OF THE INVENTION

This invention relates to a process for the hydrocracking and hydrodenitrogenation of a feedstock comprising a light catalytic cycle oil to a product having an increased heavy naphtha fraction, which comprises reacting the feedstock with hydrogen at hydrocarbon hydrocracking conversion conditions in the presence of a catalytic composite comprising a combination of a nickel component and a tungsten component, wherein the nickel component is present in an amount ranging from about 1 to about 10 wt.% and the tungsten component is present in an amount ranging from about 10 to 30 wt.%, both calculated as oxides and based on total catalyst weight. The catalytic composite also contains a support component comprising a crystalline molecular sieve material component, and an alumina component wherein the crystalline molecular sieve material is present in the support in an amount ranging from about 25 to 60 wt.% based on the weight of the support component and wherein about 1 to 80 wt.% of the sieve material based on the total weight of the sieve material is a gallosilicate molecular sieve.

DETAILED DESCRIPTION OF THE INVENTION

The hydrocarbon charge stock subject to hydrocracking in accordance with the process of this invention suitably comprises a light catalytic cycle oil. This light catalytic cycle oil generally has a boiling range of about 350° to about 750° F., a sulfur content of about 0.5 to about 2.5 wt%, a nitrogen content of about 0.01 to about 0.15 wt% and an aromatics content of about 30 to about 70 vol.%. The light catalytic cycle oil is a product of the catalytic cracking process.

Operating conditions to be used in the hydrocracking reaction zone include an average catalyst bed temperature within the range of about 500° to 1000° F., preferably 600° to 900° F. and most preferably about 650° to about 850° F., a liquid hourly space velocity within the range of about 0.1 to about 10 volumes hydrocarbon per hour per volume catalyst, a total pressure within the range of about 500 psig to about 5,000 psig, and a hydrogen circulation rate of about 500 standard cubic feet to about 20,000 standard cubic feet per barrel.

The process of the present invention is highly naphtha selective with decreased production of light gases.

The process of the present invention is preferably carried out in a single reaction zone wherein the reaction zone can comprise a plurality of catalyst beds. Each catalyst bed can have intrabed quench to control temperature rise due to the exothermic nature of the hydrocracking reactions. The charge stock may be a liquid, vapor, or liquid-vapor phase mixture, depending upon the temperature, pressure, proportion of hydrogen, and particular boiling range of the charge stock processed. The source of the hydrogen being admixed can comprise a hydrogen-rich gas stream obtained from a catalytic reforming unit.

The catalyst used in the process of the present invention comprises a hydrogenation component and a catalyst support.

The hydrogenation component of the present invention comprises nickel and tungsten and/or their compounds. The nickel and tungsten are present in the amounts specified below. These amounts are based on the total catalytic composite or catalyst weight and are calculated as the oxides, NiO and $W_3$. In another embodiment of the present invention, the hydrogenation component can additionally comprise a phosphorus component. The amount of phosphorus component is calculated as $P_2O_5$ with the ranges thereof also set out below.

| | Broad | Preferred | Most Preferred |
|---|---|---|---|
| NiO, wt. % | 1–10 | 1.5–5.0 | 1.5–4.0 |
| WO$_3$, wt. % | 10–30 | 15–25 | 15–20 |
| P$_2$O$_5$, wt. % | 0.0–5.0 | 0.0–2.0 | 0.0–1.0 |

The hydrogenation component may be deposited upon the support by impregnation employing heat-decomposable salts of the above-described metals or any other method known to those skilled in the art. Each of the metals may be impregnated onto the support separately, or they may be co-impregnated onto the support. The composite is subsequently dried and calcined to decompose the salts and to remove the undesired anions.

Another component of the catalytic composite or catalyst is the support. The support comprises a crystalline molecular sieve material comprising a gallosilicate molecular sieve material and at least one other molecular sieve material and alumina. The preferred alumina is gamma alumina. The overall amount of crystalline molecular sieve material is present in an amount ranging from about 25 to about 60 wt.%, preferably from about 35 to about 50 wt.% based on the total weight of the support. About 1 to 80 wt.% of the sieve material, preferably about 5 to 60 wt.% and most preferably about 10 to 40 wt.% is the gallosilicate molecular sieve component based on the total weight of the sieve component.

Preferably, the crystalline molecular sieve material is distributed throughout and suspended in a porous matrix of the alumina. The process of the present invention requires the use of alumina in the catalyst support in contradistinction to U.S. Pat. Nos. 4,576,711, 4,563,434, and 4,517,073 to Ward et al. and U.S. Pat. No. 3,536,605 to Kittrell et al. which require the presence of silica-alumina matrix material.

The support may be prepared by various well-known methods and formed into pellets, beads, and extrudates of the desired size. For example, the crystalline molecular sieve material may be pulverized into finely divided material, and this latter material may be intimately admixed with the gamma alumina. The finely divided crystalline molecular sieve material may be admixed thoroughly with a hydrosol or hydrogel of the gamma alumina. Where a thoroughly blended hydrogel is obtained, this hydrogel may be dried and broken into pieces of desired shapes and sizes. The hydrogel may also be formed into small spherical particles by conventional spray drying techniques or equivalent means.

The molecular sieve materials exclusive of the essential gallosilicate molecular sieve material of the invention preferably are selected from the group consisting of faujasite-type crystalline aluminosilicates, and mordenite-type crystalline aluminosilicates. Although not preferred, crystalline aluminosilicates such as ZSM-5, ZSM-11, ZSM-12, ZSM-23, and ZSM-35, and an AMS-1B crystalline molecular sieve can also be used with varying results alone or in combination with the faujasite-type or mordenite-type crystalline aluminosilicate. Examples of a faujasite-type crystalline aluminosilicate are low-alkali metal Y-type crystalline aluminosilicates, metal-exchanged X-type and Y-type crystalline aluminosilicates, and ultrastable Y large-pore crystalline aluminosilicate material. Zeolon is an example of a mordenite-type crystalline aluminosilicate.

Ultrastable, large-pore crystalline aluminosilicate material is represented by Z-14US zeolites which are described in U.S. Pat. Nos. 3,293,192 and 3,449,070. Each of these patents is incorporated by reference herein and made a part hereof. By large-pore material is meant a material that has pores which are sufficiently large to permit the passage thereinto of benzene molecules and larger molecules and the passage therefrom of reaction products. For use in petroleum hydrocarbon conversion processes, it is often preferred to employ a large-pore molecular sieve material having a pore size of at least 5Å(0.5 nm) to 10Å (1 nm).

The ultrastable, large-pore crystalline aluminosilicate material is stable to exposure to elevated temperatures. This stability in elevated temperatures is discussed in the aforementioned U.S. Pat. Nos. 3,293,192 and 3,449,070. It may be demonstrated by a surface area measurement after calcination at 1,725° F. In addition, the ultrastable, large-pore crystalline aluminosilicate material exhibits extremely good stability toward wetting, which is defined as the ability of a particular aluminosilicate material to retain surface area or nitrogen-adsoprtion capacity after contact with water or water vapor. A sodium-form of the ultrastable, large-pore crystalline aluminosilicate material (about 2.15 wt.% sodium) was shown to have a loss in nitrogen-absorption capacity that is less than 2% per wetting, when tested for stability to wetting by subjecting the material to a number of consecutive cycles, each cycle consisting of a wetting and a drying.

The ultrastable, large-pore crystalline aluminosilicate material that is preferred for the catalytic composition of this invention exhibits a cubic unit cell dimension and hydroxyl infrared bands that distinguish it from other aluminosilicate materials. The cubic unit cell dimension of the preferred ultrastable, large-pore crystalline aluminosilicate is within the range of about 24.20 Angstrom units (Å) to about 24.55Å. The hydroxyl infrared bands obtained with the preferred ultrastable, large-pore crystalline aluminosilicate material are a band near 3,745 cm$^{-1}$ (3,745±5 cm$^{-1}$), a band near 3,695 cm$^{-1}$ (3,690±10 cm$^{-1}$), and a band near 3,625 cm$^{-1}$ (3,610±15 cm$^{-1}$). The band near 3,745 cm$^{-1}$ may be found on many of the hydrogen-form and decationized aluminosilicate materials, but the band near 3,695 cm$^{-1}$ and the band near 3,625 cm$^{-1}$ are characteristic of the preferred ultrastable, large-pore crystalline aluminosilicate material that is used in the catalyst of the present invention.

The ultrastable, large-pore crystalline aluminosilicate material is characterized also by an alkaline metal content of less than 1%.

Another example of a crystalline molecular sieve zeolite that can be employed in the catalytic composition of the present invention is a metal-exchanged Y-type molecular sieve. Y-type zeolitic molecular sieves are discussed in U.S. Pat. No. 3,130,007. The metal-exchanged Y-type molecular sieve can be prepared by replacing the original cation associated with the molecular sieve by a variety of other cations according to techniques that are known in the art. Ion exchange techniques have been disclosed in many patents, several of which are U.S. Pat. Nos. 3,140,249, 3,140,251, and 3,140,253. Specifically, a mixture of rare earth metals can be exchanged into a Y-type zeolitic molecular sieve and such a rare earth metal-exchanged Y-type molecular sieve can be employed suitably in the catalytic composition of the present invention. Specific examples of suitable rare earth metals are cerium, lanthanum, and praseodymium.

An additional molecular sieve that can be used in the catalytic composition of the present invention is an AMS-1B crystalline borosilicate, which is described in U.S. Pat. No. 4,269,813, which patent is incorporated by reference herein and made a part thereof.

A suitable AMS-1B crystalline borosilicate is a molecular sieve material having the following composition in terms of mole ratios of oxides:

$0.9 \pm 0.2 M_{2/n}O:B_2O_3:YSiO_2:ZH_2O$, wherein M is at least one cation having a valence of n, Y is within the range of 4 to about 600, and Z is within the range of 0 to about 160, and providing an X-ray diffraction pattern comprising the following X-ray diffraction lines and assigned strengths:

| d(Å) | Assigned Strength |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M |

Mordenite-type crystalline aluminosilicates can be employed in the catalyst of the present invention. Mordenite-type crystalline aluminosilicate zeolites have been discussed in patent art, e.g., by Kimberlin in U.S. Pat. No. 3,247,098, by Benesi, et al., in U.S. Pat. No. 3,281,483, and by Adams, et al., in U.S. Pat. No. 3,299,153. Those portions of each of these patents which portions are directed to mordenite-type aluminosilicates are incorporated by reference and made a part hereof.

The catalyst employed according to the process of the present invention also comprises a gallosilicate molecular sieve component. The gallosilicate molecular sieve component is present in an amount ranging from about 1 to about 30 wt.% based on the total amount of support component in the catalyst. Preferably, the amount of gallosilicate molecular sieve ranges from about 3 to about 15 wt.% based on the total weight of the support component. The gallosilicate can be prepared using conventional methods known to those skilled in the art. A suitable method is disclosed in European Patent Application No. 01 107 875 which is incorporated herein by reference.

In another method the gallosilicate crystalline molecular sieves of this invention are characterized by the representative X-ray pattern listed below and by the composition formula:

$0.9 \pm 0.2 M_{2/n}O:Ga_2O_3:ySiO_2:zH_2O$ wherein M is at least one cation, n is the valence of the cation, y is between 4 and about 600, and z is between 0 and about 160. It is believed that the small gallium content of the sieves is at least in part incorporated in the crystalline lattice. Various attempts to remove the gallium from the gallosilicate sieves by exhaustive exchange with sodium, ammonium, and hydrogen ions were unsuccessful and therefore, the gallium content is considered nonexchangeable in the instant sieves prepared according to the present method.

| d-Spacing Å (1) | Assigned Strength (2) | d-Spacing Å (1) | Assigned Strength (2) |
| --- | --- | --- | --- |
| 11.10 ± 0.20 | VS | 3.84 ± 0.10 | MS |
| 9.96 ± 0.20 | MS | 3.71 ± 0.10 | M |
| 6.34 ± 0.20 | W | 3.64 ± 0.10 | W |
| 5.97 ± 0.20 | W | 2.98 ± 0.10 | VW |
| 5.55 ± 0.20 | W | | |
| 4.25 ± 0.10 | VW | | |

(1) Copper K alpha radiation
(2) VW = very weak; W = weak; M = medium; MS = medium strong; VS = very strong A gallosilicate molecular sieve useful in this invention can be prepared by crystallizing an aqueous mixture at a controlled pH, of a base, a gallium ion-affording material, an oxide of silicon, and an organic template compound.

Typically, the molar ratios of the various reactants can be varied to produce the crystalline gallosilicates of this invention. Specifically, the molar ratios of the initial reactant concentrations are indicated below:

| | Broad | Preferred | Most Preferred |
| --- | --- | --- | --- |
| $SiO_2/Ga_2O_3$ | 4–200 | 10–150 | 20–100 |
| Organic base/$SiO_2$ | 0.5–5 | 0.05–1 | 0.1–0.5 |
| $H_2O/SiO_2$ | 5–80 | 10–50 | 20–40 |
| Template/$SiO_2$ | 0–1 | 0.01–0.2 | 0.02–0.1 |

By regulation of the quantity of gallium (represented as $Ga_2O_3$) in the reaction mixture, it is possible to vary the $SiO_2/Ga_2O_3$ molar ratio in the final product. In general, it is desirable to have the gallium content of the gallosilicate sieve of this invention between about 0.1 and about 8 percent by weight of gallium. More preferably, the amount of gallium should be between about 0.2 and about 6 weight percent gallium and, most preferably, between about 0.3 and about 4 weight percent of gallium. Too much gallium in the reaction mixture appears to reduce the sieve crystallinity which reduces the catalytic usefulness of the sieve.

More specifically, a material useful in the present invention is prepared by mixing a base, a gallium ion-affording substance, an oxide of silicon, and an organic template compound in water (preferably distilled or deionized). The order of addition usually is not critical although a typical procedure is to dissolve the organic base and the gallium ion-affording substance in water and then add the template compound. Generally, the silicon oxide compound is added with mixing and the resulting slurry is transferred to a closed crystallization vessel for a suitable time. After crystallization, the resulting crystalline product can be filtered, washed with water, dried, and calcined.

During preparation, acidic conditions should be avoided. Advantageously, the pH of the reaction mixture falls within the range of about 9.0 to about 13.0; more preferably between about 10.0 and about 12.0 and most preferably between about 10.5 and 11.5.

Examples of oxides of silicon useful in this invention include silicic acid, sodium silicate, tetraalkyl silicates, and Ludox stabilized polymer of silicic acid manufactured by E. I. DuPont de Nemours & Co. Typically, the oxide of gallium source is a water-soluble gallium compound such as gallium nitrate or gallium acetate or another gallium compound, the anion of which is easily removed during sieve calcination prior to use. Water insoluble gallium compounds such as the oxide can be used as well.

Cations useful in the formation of the gallosilicate sieves include the sodium ion and the ammonium ion. The sieves also can be prepared directly in the hydrogen form with an organic base such as ethylenediamine.

The acidity of the gallosilicate sieves of this invention is high as measured by the Hammett $H_o$ function which lies in the neighborhood of about $-3$ to about $-6$.

Organic templates useful in preparing the crystalline gallosilicate include alkylammonium cations or precursors thereof such as tetraalkylammonium compounds, especially tetra-n-propylammonium compounds. A useful organic template is tetra-n-propylammonium bromide. Diamines, such as hexamethylenediamine, can be used.

Specifically, the crystalline gallosilicate molecular sieve useful in the present invention can be prepared by crystallizing a mixture of sources for an oxide of silicon, an oxide of gallium, an alkylammonium compound, and a base such as sodium hydroxide, ammonium hydroxide or ethylenediamine such that the initial reactant molar ratios of water to silica range from about 5 to about 80, preferably from about 10 to about 50 and most preferably from about 20 to about 40. In addition, preferable molar ratios for initial reactant silica to oxide of gallium range from about 4 to about 200, more preferably from about 10 to about 150 and most preferably from about 20 to about 100. The molar ratio of base to silicon oxide should be above about 0.5, typically below about 5, preferably between about 0.05 and about 1.0 and most preferably between about 0.1 and about 0.5. The molar ratio of aklylammonium compound, such as tetra-n-propylammonium bromide, to silicon oxide can range from 0 to about 1 or above, typically above about 0.005, preferably about 0.01 to about 0.2, most preferably about 0.02 to about 0.1.

The resulting slurry is transferred to a closed crystallization vessel and reacted usually at a pressure at least the vapor pressure of water for a time sufficient to permit crystallization which usually is about 0.25 to about 25 days, typically is about one to about ten days and preferably is about one to about seven days, at a temperature ranging from about 100° to about 250° C., preferably about 125° to about 200° C. The crystallizing material can be stirred or agitated as in a rocker bomb. Preferably, the crystallization temperature is maintained below the decomposition temperature of the organic template compound. Especially preferred conditions are crystallizing at about 165° C. for about three to about seven days. Samples of material can be removed during crystallization to check the degree of crystallization and determine the optimum crystallization time.

The crystalline material formed can be separated and recovered by well-known means such as filtration with aqueous washing. This material can be mildly dried for anywhere from a few hours to a few days at varying temperatures, typically about 50° to about 225° C., to form a dry cake which can then be crushed to a powder or to small particles and extruded, pelletized, or made into forms suitable for its intended use. Typically, materials prepared after mild drying contain the organic template compound and water of hydration within the solid mass and a subsequent activation or calcination procedure is necessary, if it is desired to remove this material from the final product. Typically, the mildly dried product is calcined at temperatures ranging from about 260° to about 850° C. and preferably from about 425° to about 600° C. Extreme calcination temperatures or prolonged crystallization times may prove detrimental to the crystal structure or may totally destroy it. Generally, there is no need to raise the calcination temperature beyond about 600° C. in order to remove organic material from the originally formed crystalline material. Typically, the molecular sieve material is dried in a forced draft oven at 165° C. for about 16 hours and is then calcined in air in a manner such that the temperature rise does not exceed 125° C. per hour until a temperature of about 540° C. is reached. Calcination at this temperature usually is continued for about 4 hours. The gallosilicate sieves thus made generally have a surface area greater than about 300 sq. meters per gram as measured by the BET procedure.

The Gallo Theta-1 gallosilicate disclosed in U.S. Pat. No. 4,585,641 (Barri et al.) can also be employed in the catalyst of the process of the invention.

In accordance with the invention, above-described gallosilicate molecular sieve is combined, dispersed or otherwise intimately admixed in a support component containing the other molecular sieve component and the alumina component.

The present invention is described in further detail in connection with the following Examples, it being understood that the example is for purposes of illustration and not limitation.

EXAMPLE 1

The present Example serves to demonstrate the importance of utilizing nickel, tungsten, alumina, and a molecular sieve component in the amounts prescribed by the present invention as compared with alternative processes utilizing hydrocracking catalysts of differing compositions.

Comparative catalysts and the catalysts having nickel, tungsten, alumina, and a sieve component (USY sieve) in accordance with the invention, however, not containing the gallosilicate molecular sieve component, were used to convert a light catalytic cycle oil feedstock to naphtha and distillate products thereby determining the hydrodenitrogenation, hydrocracking, and polyaromatic saturation activities. Table 1 below sets out the properties of the feedstock used in each test run.

TABLE 1

| Feed Properties | |
|---|---|
| API gravity | 21.9 |
| C, % | 88.58 |
| H, % | 10.37 |
| S, % | 0.55 |
| N, ppm | 485 |
| Total aromatics, wt. % | 69.5 |
| Polyaromatics, wt. % | 42.2 |
| Simulated distillation, °F. | |
| IBP, wt. % | 321 |
| 10 | 409 |
| 25 | 453 |
| 50 | 521 |
| 75 | 594 |
| 90 | 643 |
| FBP | 756 |

The following Table 2 sets out the composition of each catalyst used in the present example to convert the feed described in Table 1. Catalysts B, C, and G contain nickel, tungsten, alumina and a molecular sieve component, specifically an ultrastable Y sieve designated as "USY." They do not, however, contain a gallosilicate component in accordance with the present invention. Commercial catalyst (I) is a commercially available high activity hydrocracking catalyst. Commercial catalyst (II) is a commercially available denitrogenation catalyst.

TABLE 2

| Catalyst | Metals (wt %) | USY Sieve (%) | Support |
|---|---|---|---|
| A | NiO(3.5)WO$_3$(18.0) | 0 | γ—Al$_2$O$_3$ |
| B | NiO(2.0)WO$_3$(18.0) | 35 | γ—Al$_2$O$_3$ |
| C | NiO(2.0)WO$_3$(18.0) | 50 | γ—Al$_2$O$_3$ |
| D | NiO(2.0)WO$_3$(18.0) | 35 | SiO$_2$—Al$_2$O$_3$ |
| E | NiO(3.0)MoO$_3$(18.0) P(1.5) | 35 | γ—Al$_2$O$_3$ |
| F | CoO(3.0)MoO$_3$(10.0) | 35 | SiO$_2$—Al$_2$O$_3$ |
| G | NiO(2.0)WO$_3$(18.0) P$_2$O$_5$(0.75) | 35 | Al$_2$O$_3$ |
| H | NiO(3.5)MoO$_3$(18.0) P$_2$O$_3$(3.0) | 35 | Al$_2$O$_3$ |
| Commercial (I) | NiO MoO$_3$ | High | Unknown |
| Commercial (II) | NiO MoO$_3$ | 0 | γ—Al$_2$O$_3$ |

Each catalyst was first tested to determine its hydrodenitrogenation activity, and a polycyclic aromatic saturation activity.

The reaction conditions for hydrodenitrogenation (HDN) and polycyclic aromatic saturation include a temperature of 675° F., and pressure of 1250 psig. The test reactor contained 4.0 grams of catalyst crushed to a 14/20 mesh size for each test run. The feed rates were 40 g/hr and 60 g/hr for the hydrodenitrogenation tests and polycyclic aromatic saturation tests respectively.

Using Catalyst D as a reference for the determination of all activities, the relative activities for HDN were calculated by equation 1:

$$HDN \ Act = \frac{\log(N_F/N_P)}{\log(N_f/N_p)_{ref}} \quad (1)$$

$N_F$ and $N_p$ are the nitrogen concentration in the feed and product, respectively and $N_f$ and $N_p$ are the nitrogen concentration in the feed and product respectively for the reference catalyst. Similarly, the polyaromatic saturation activity (naphthalene saturation) was determined according to equation 2:

$$Polyaromatic \ Saturation \ Act = \frac{\log(Nap_F/Nap_P)}{\log(Nap_f/Nap_p)_{ref}} \quad (2)$$

$Nap_F$ and $Nap_P$ are the concentration of naphthalene in the feed and the product, respectively. $Nap_f$ and $Nap_p$ are the concentration of naphthalene in the feed and product respectively for the reference catalyst.

In order to determine the hydrocracking activity for each catalyst, the amount of catalyst used in each run was increased to 18.75 g. The catalyst used in each run was crushed to a 14/20 mesh size. Each test run was carried out at a temperature sufficient to obtain about 77 wt. % conversion of the reactor influent to material having a boiling range less than about 380° F. The WHSV was 1.6 and the reactor pressure was 1250 psig. The hydrocracking activity was determined by equation 3:

$$Hydrocracking \ Act = e^{-35,000/R\left(\frac{1}{T} - \frac{1}{T_{ref}}\right)} \quad (3)$$

In equation 3, R is the gas constant 1.987 cal/° K., the temperature is in degrees Kelvin where T designates the temperature at which the conversion takes place and $T_{ref}$ is 658.2° K., and 35,000 cal is the activation energy for hydrocracking. The catalyst activities certain of the catalysts from Table 2 is given below in Table 3.

TABLE 3

| Catalyst | Activities | | |
|---|---|---|---|
| | HDN | Polyaromatic Saturation | Hydrocracking |
| A | 1.1 | 2.3 | None |
| B | 1.3 | 2.0 | 1.2 |
| C | 1.2 | 2.0 | 1.3 |
| D | 1.0 | 1.0 | 1.0 |
| E | 1.3 | 1.0 | 0.5 |
| F | 0.4 | 0.4 | 0.4 |
| Commercial (I) | 0.6 | 0.3 | 1.0 |
| Commercial (II) | 1.0 | 1.6 | None |

An inspection of Table 3 shows that for each of the activities, CoMo on 35% USY sieve dispersed in a $SiO_2$-$Al_2O_3$ matrix (Catalyst F) is the least active.

Further, the addition of 35% USY sieve (Catalyst B) or 50% USY sieve (Catalyst C) to NiW on $\gamma$-$Al_2O_3$ (Catalyst A) increased the HDN activity and hydrocracking activity. Catalysts B and C, therefore, are better for HDN than are traditional non-sieve-containing hydrodenitrogenation catalysts (such as Catalyst A, and the commercial (II) catalyst).

Catalysts D and B are identical (2% NiO, 18% $WO_3$ and 35% USY) except for the support composition. The support for Catalyst B in accordance with the present invention, except for the presence of gallosilicate, contains $\gamma$-$Al_2O_3$, while the support for Catalyst D contains silica-alumina. The HDN and hydrocracking activities for Catalyst B (1.3 and 1.2, respectively) are higher than those for Catalyst D (1.0 and 1.0). In addition Catalyst B has a much higher polyaromatic saturation activity (2.0) than Catalyst D (1.0). For each of these reactions, $\gamma$-$Al_2O_3$ in accordance with the invention is a preferred support component when nickel and tungsten are used as hydrogenation components.

Commercial HDN catalysts most often contain NiMo or phosphorus-promoted NiMo supported on $\gamma$-$Al_2O_3$. As can also be seen from Table 3, NiW and NiMo are equally active for HDN. For example, the HDN activity of Catalyst A (NiW) and the commercial (II) catalyst are 1.1 and 1.0 respectively. Both Catalyst A and the commercial (II) catalyst are non-sieve catalysts with the metals supported on $\gamma$-$Al_2O_3$. Similarly, the HDN activities for Catalyst B (NiW) and Catalyst E (NiMo) are the same. Both catalysts B and E, had the same support, namely: 35% USY sieve dispersed in $\gamma$-$Al_2O_3$. However, while the HDN activities for Catalysts B and E are the same, the hydrocracking activity for Catalyst B is substantially higher (1.2 vs. 0.5) than that of Catalyst E. This test also shows that at the same molecular sieve level and with the same support, the use of NiW, in accordance with the present invention, is much more effective for hydrocracking than is the use of NiMo as the hydrogenation component.

The product selectivities for several comparative catalysts and the catalysts containing nickel, tungsten, alumina, and a molecular sieve components in accordance with the present invention (however devoid of a gallosilicate molecular sieve component) were determined. Table 4 below sets out the reaction conditions, conversion, and selectivities for each test run. The reactor catalyst loadings are also set out. The WHSV was adjusted to give about the same conversion for each test run.

TABLE 4

| | Run No. | | |
|---|---|---|---|
| | 1 | 2 | 3 |
| Catalyst loading, g: | 6.25B 12.50C | 18.75B | 18.75 commercial (I) |
| Operating Conditions: | | | |
| Pressure, psi | 1250 | 1250 | 1250 |
| Temperature, °F. | 712 | 706 | 703 |
| WHSV, hr-1 | 1.57 | 1.66 | 1.44 |
| Wt. % Conversion to <380° F. | 77.1 | 76.7 | 76.6 |
| Product Selectivity, wt. % | | | |
| $C_1$-$C_3$ | 3.08 | 2.68 | 3.49 |
| $C_4$ | 8.07 | 8.13 | 8.21 |
| $C_5$ | 7.27 | 7.09 | 7.61 |
| $C_6$-180° F. naphtha | 11.98 | 11.72 | 11.43 |
| 180-380° F. naphtha | 46.71 | 47.16 | 45.84 |
| 380°+ | 22.90 | 23.30 | 23.40 |

| | Run No. | | | |
|---|---|---|---|---|
| | 4 | 5 | 6 | 7 |
| Catalyst loading, g: | 6.25D 12.50F | 18.75H | 18.75G | 6.25B 12.50F |
| Operating Conditions: | | | | |
| Pressure, psi | 1250 | 1250 | 1250 | 1250 |
| Temperature, °F. | 724 | 726 | 701 | 716 |

TABLE 4-continued

| | | | | |
|---|---|---|---|---|
| WHSV, hr-1 | 1.57 | 1.58 | 1.69 | 1.63 |
| Wt. % Conversion to <380° F. | 76.9 | 76.0 | 77.0 | 76.0 |
| Product Selectivity, wt. % | | | | |
| $C_1$–$C_3$ | 3.93 | 3.55 | 2.47 | 3.28 |
| $C_4$ | 8.58 | 8.22 | 8.15 | 8.08 |
| $C_5$ | 7.93 | 7.61 | 7.44 | 7.54 |
| $C_6$ -180° F. naphtha | 11.50 | 11.62 | 12.67 | 11.60 |
| 180–380° F. naphtha | 44.93 | 44.96 | 46.20 | 45.55 |
| 380°+ | 23.10 | 24.00 | 23.00 | 24.00 |

The following Table 5 below sets out the product analysis for each test run in Table 4 above.

TABLE 5

Product Analysis

| | Run No. 1 | Run No. 2 | Run No. 3 |
|---|---|---|---|
| Total product | | | |
| API gravity | 52.1 | 52.7 | 48.8 |
| % C | 86.13 | 85.90 | 86.70 |
| % H | 13.87 | 14.10 | 13.30 |
| Total aromatics, wt. % | 20.6 | 15.0 | 32.5 |
| Polyaromatics, wt. % | 0.1 | 0.0 | 0.3 |
| Naphtha | | | |
| API gravity | 53.8 | 55.4 | 51.0 |
| % C | 86.26 | 85.99 | 86.76 |
| % H | 13.74 | 14.01 | 13.24 |
| Paraffins, wt. % | 31.4 | 33.8 | 30.3 |
| Naphthenes, wt. % | 49.9 | 52.6 | 41.0 |
| Aromatics, wt. % | 18.7 | 13.6 | 28.7 |
| Distillate | | | |
| API gravity | 39.3 | 40.1 | 35.9 |
| % C | 86.77 | 86.42 | 88.12 |
| % H | 12.23 | 13.58 | 12.62 |
| Total aromatics, wt. % | 31.3 | 20.2 | 48.4 |
| Polyaromatics, wt. % | 1.1 | 1.0 | 2.7 |

| | Run No. 4 | Run No. 5 | Run No. 6 | Run No. 7 |
|---|---|---|---|---|
| Total product | | | | |
| API gravity | 40.5 | 49.7 | 51.8 | 51.1 |
| % C | 86.80 | 86.75 | 85.95 | 85.54 |
| % H | 13.20 | 13.24 | 14.05 | 13.46 |
| Total aromatics, wt. % | 36.0 | 31.9 | 14.4 | 30.1 |
| Polyaromatics, wt. % | 0.4 | 0.3 | 0.4 | 0.2 |
| Naphtha | | | | |
| API gravity | 56.8 | 51.3 | 57.2 | 55.4 |
| % C | 86.45 | 86.84 | 85.93 | 86.24 |
| % H | 13.55 | 13.16 | 14.07 | 13.76 |
| Paraffins, wt. % | 39.3 | 31.6 | 35.2 | 36.3 |
| Naphthenes, wt. % | 31.2 | 39.6 | 51.9 | 38.4 |
| Aromatics, wt. % | 29.5 | 28.8 | 13.0 | 25.3 |
| Distillate | | | | |
| API gravity | 35.6 | 35.6 | 41.4 | 37.5 |
| % C | 87.79 | 87.38 | 86.38 | 87.43 |
| % H | 12.21 | 12.62 | 13.62 | 12.57 |
| Total aromatics, wt. % | 56.0 | 49.6 | 17.0 | 46.7 |
| Polyaromatics, wt. % | 3.3 | 3.0 | 1.1 | 2.6 |

As is evident from the above Table 4, when operated at the same conversion, the commercial catalyst (I) is less naphtha selective than the catalysts exemplified in runs 1, 2, and 6. The commercial catalyst also has a higher selectivity to undesirable $C_1$–$C_5$ light gas products. Also, the process exemplified in runs 1, 2, and 6 was more naphtha selective than the processes exemplified in comparative runs 4, 5, and 7. Specifically, the catalyst blend used in run 4 contained ⅓ catalyst D and ⅔ catalyst F. Catalyst D contained silica-alumina in its support not in accordance with the present invention, while catalyst F contained Co, Mo, and silica-alumina not in accordance with the present invention. Catalyst H, used in run 5, contained Mo not in accordance with the invention and displayed a lower naphtha yield than the process of the invention. Additionally, in run 7 where ⅔ of the catalyst blend was catalyst F, the naphtha yield was similarly lower. All of the light gas yields for the invention catalysts were also lower than those determined in comparative runs 4, 5, and 7.

The distillate fractions prepared using the catalysts exemplified in runs 1, 2, and 6 have markedly lower aromatics contents than the distillate fractions yielded by the comparative processes rendering the fractions prepared in runs 1, 2, and 6 suitable for the use in preparing diesel fuel and jet fuel.

EXAMPLE 2

The process of the invention was compared with two alternative comparative processes. In accordance with the process of the invention, the support component of the catalyst contained 10 wt.% gallosilicate and 25 wt.% USY zeolite based on the total weight of the catalyst support.

The first comparative catalyst, Catalyst I contained 10 wt.% ZSM-5 and 25 wt.% USY zeolite whereas the second comparative catalyst, Catalyst J contained 35 wt.% USY zeolite.

The catalysts were prepared by mixing the respective amounts of sieve(s) with alumina sol thoroughly in a Waring blender. The so-blended material was subsequently dried overnight at 250° F., ground to 20 U.S. sieve mesh size and calcined at 1000° F. for about 3 hours.

The calcined product was then impregnated dropwise (using a dropping funnel) with a solution of the active hydrogenation metals. The impregnated catalysts were then allowed to stand for about 3 hours and then dried under a heat lamp overnight at about 250° F. The catalysts were then calcined at about 1000° F. (except catalyst I which was calcined at about 932° F.) Each catalyst was then pelletized to a 3/16 inch size and recalcined at 1000° F.

A more detailed analysis of the comparative and invention catalysts is set out below in Table 6. In the subject table "LZ-Y82" designates an ultrastable Y molecular sieve obtained from the Union Carbide Corporation.

TABLE 6

Catalyst Compositions

| | Comparative I | Comparative J | Invention |
|---|---|---|---|
| $WO_3$, g per 100 g support | 16.3 | 18.0 | 17.8 |
| NiO, g per 100 g support | 1.8 | 2.1 | 2.0 |
| Support, wt % | | | |
| Alumina | 65 | 65 | 65 |
| LZ-Y82 | 25 | 35 | 25 |
| ZSM-5 | 10 | | |
| Gallosilicate | | | 10 |

The comparative processes and the process in accordance with the invention were used to convert a light catalytic cycle oil feedstock to naphtha and distillate products.

The properties of the light catalytic cycle oil feedstock used in both the process of the invention and the comparative processes are set out below in Table 7.

TABLE 7

Feed Properties

| | |
|---|---|
| C, Wt. % | 88.60 |

TABLE 7-continued

| Feed Properties | |
|---|---|
| H, Wt. % | 10.37 |
| API Gravity | 21.9 |
| S, Wt. % | 0.55 |
| N, ppm | 538 |
| Paraffins, Wt. % | 30.0 |
| Total Aromatics, Wt. % | 70.0 |
| Naphthalene, Wt. % | 26.0 |
| Phenanthrene, Wt. % | 5.5 |
| Distillation, °F. | |
| 5 Wt. % | 391 |
| 10 Wt. % | 417 |
| 30 Wt. % | 476 |
| 50 Wt. % | 530 |
| 70 Wt. % | 593 |
| 90 Wt. % | 661 |
| 95 Wt. % | 686 |
| 99 Wt. % | 726 |
| FBP | 741 |

The reactors used in the process of the invention and the comparative processes were loaded such that about 29 grams of each catalyst was mixed with alundum on a one volume catalyst to two volumes alundum basis. This was done in order to improve flow distribution and maintain better temperature.

Both the comparative process and the process of the invention test runs were carried out on a "once-through" basis at 1250 psig, a feed rate of 40 g/hr equivalent to a WHSV of about 1.4) and a hydrogen flow rate of 12,000 SCFB. Temperature was adjusted to maintain 77 wt.% conversion of the feed material boiling above 380° F. to material boiling below 380° F.

Table 8 below sets out the actual and adjusted yields for both comparative runs and the run in accordance with the invention.

TABLE 8

| | (Actual) After 6 Days on Stream | | |
|---|---|---|---|
| | COMPARATIVE I | INVENTION | COMPARATIVE I |
| Yield, wt. % | | | |
| Dry Gas | 9.9 | 6.3 | 5.1 |
| Butane | 16.3 | 12.9 | 13.9 |
| Pentane | 13.7 | 11.8 | 11.7 |
| Light Naphtha | 18.5 | 18.6 | 19.4 |
| Heavy Naphtha | 44.6 | 53.4 | 52.9 |
| Isomer Ratio | | | |
| I/N Butane | 1.06 | 1.10 | 1.53 |
| I/N Pentane | 2.05 | 1.68 | 2.15 |
| Temp., °F. | 742.3 | 738.4 | 726.4 |
| Conversion, wt. % | 76.9 | 74.0 | 76.0 |
| | Corrected to 77% Conversion | | |
| Yield, wt. % | | | |
| Dry Gas | 8.7 | 5.3 | 5.0 |
| Butane | 15.4 | 12.5 | 14.0 |
| Pentane | 12.8 | 11.4 | 11.7 |
| Light Naphtha | 18.3 | 18.6 | 19.5 |
| Heavy Naphtha | 47.8 | 55.2 | 52.8 |
| Isomer Ratio | | | |
| I/N Butane | 1.06 | 1.68 | 1.55 |
| I/N Pentane | 2.28 | 2.03 | 2.21 |
| Conversion temperature, °F. | 742 | 740 | 728 |

As is readily apparent from the above data, the process of the invention clearly is more selective towards heavy naphtha. Specifically, the corrected yields show that the heavy naphtha yield for the process of the invention wherein gallosilicate is employed in the catalyst is markedly higher e.g. 55.2 wt.% versus 47.8 and 52.8 wt.%.

What is claimed is:

1. A process for the hydrocracking of a feedstock comprising a light catalytic cycle oil which comprises reacting the feedstock with hydrogen at hydrocracking conversion conditions in the presence of a catalyst comprising a hydrogenation component comprising a nickel component and a tungsten component wherein the nickel component is present in an amount ranging from about 1 to about 10 wt.% and the tungsten component is present in an amount ranging from about 10 to about 30 wt.%, both calculated as oxides and based on the total catalyst weight and a support component comprising a crystalline molecular sieve component and an alumina component wherein the crystalline molecular sieve component is present in an amount less than about 60 wt.% and greater than about 25 wt.% based on the total weight of the support component and wherein about 1 to about 80 wt.% of the sieve component is a gallosilicate molecular sieve based on the total weight of the molecular sieve component.

2. The process of claim 1 wherein said hydrogenation component also contains a phosphorus component present in an amount ranging up to about 5.0 wt.% calculated as the oxide and based on total catalyst weight.

3. The process of claim 1 wherein said alumina component is gamma alumina.

4. The process of claim 1 wherein said crystalline molecular sieve component other than said gallosilicate molecular sieve is a Y zeolite.

5. The process of claim 4 wherein said Y zeolite is an ultrastable Y zeolite.

6. The process of claim 1 wherein said light catalytic cycle oil contains at least about 30 vol.% aromatics.

7. The process of claim 1 wherein said gallosilicate molecular sieve is present in an amount ranging from about 5 to about 60 wt.% based on the total weight of the sieve component.

8. The process of claim 1 wherein said gallosilicate molecular sieve is present in an amount ranging from about 10 to about 40 wt.% based on the total weight of the sieve component.

9. The process of claim 1 wherein said nickel component is present in an amount ranging from about 1.5 to about 5.0 wt.%, said tungsten component is present in an amount ranging from about 15 to about 25 wt.%, both calculated as oxides, and said crystalline molecular sieve component is present in an amount less than about 50 wt.% and greater than about 35 wt.% based on the total weight of said support component and wherein about 1 to about 80 wt.% of the sieve component is a gallosilicate molecular sieve based on the total weight of the sieve component.

10. The process of claim 9 wherein said hydrogenation component also contains a phosphorus component present in an amount ranging up to about 2.0 wt.% calculated as the oxide and based on total catalyst weight.

11. The process of claim 9 wherein said alumina component is gamma alumina.

12. The process of claim 9 wherein said crystalline molecular sieve component other than said gallosilicate molecular sieve is a Y zeolite.

13. The process of claim 12 wherein said Y zeolite is an ultrastable Y zeolite.

14. The process of claim 9 wherein said light catalytic cycle oil contains at least about 30 vol.% aromatics.

15. The process of claim 9 wherein said gallosilicate molecular sieve is present in an amount ranging from about 5 to about 60 wt.% based on the total weight of said sieve component.

16. The process of claim 9 wherein said gallosilicate molecular sieve is present in an amount ranging from about 10 to about 40 wt.% based on the total weight of said sieve component.

17. The process of claim 1 wherein said nickel component is present in an amount ranging from about 1.5 to about 4.0 wt.%, said tungsten component is present in an amount ranging from about 15 to about 20 wt.%, both calculated as oxides, and said crystalline molecular sieve component is present in an amount less than about 50 wt.% and greater than about 35 wt.% based on the weight of support component and wherein about 1 to about 80 wt.% of the sieve material is a gallosilicate molecular sieve based on the weight of the sieve component.

18. The process of claim 17 wherein said hydrogenation component also contains a phosphorus component present in an amount ranging up to about 1.0 wt.% calculated as the oxide and based on total catalyst weight.

19. The process of claim 17 wherein said alumina component is gamma alumina.

20. The process of claim 17 wherein said crystalline molecular sieve component other than said gallosilicate molecular sieve is a Y zeolite.

21. The process of claim 18 wherein said Y zeolite is an ultrastable Y zeolite.

22. The process of claim 17 wherein said light catalytic cycle oil contains at least about 30 vol.% aromatics.

23. The process of claim 17 wherein said gallosilicate molecular sieve is present in an amount ranging from about 5 to about 60 wt.% based on the total weight of said sieve component.

24. The process of claim 17 wherein said gallosilicate molecular sieve is present in an amount ranging from about 10 to about 40 wt.% based on the total weight of said sieve component.

* * * * *